United States Patent

[11] 3,615,712

[72] Inventor Robert G. Keller
Waltham, Mass.

[21] Appl. No. 811,872
[22] Filed Apr. 1, 1969
[45] Patented Oct. 26, 1971
[73] Assignee CPC International Inc.

[54] PLASTIC FOOD POUCH FOR COOKING
4 Claims, 7 Drawing Figs.

[52] U.S. Cl. .......... 99/171 H, 206/46 F
[51] Int. Cl. .......... B65b 25/22
[50] Field of Search .......... 99/171 R, 171 LP, 174, 171 H, 171 I

[56] References Cited

UNITED STATES PATENTS

| | | | |
|---|---|---|---|
| 2,350,931 | 6/1944 | Salfisberg | 99/171 UX |
| 2,969,292 | 1/1961 | Heller | 99/174 |
| 2,970,920 | 2/1961 | Forkner | 99/171 |
| 3,081,174 | 3/1963 | Gay | 99/174 |
| 3,248,359 | 4/1966 | Maloney | 260/897 B |
| 3,250,825 | 5/1966 | Martinovich | 260/897 A |
| 3,446,631 | 5/1969 | Samuels | 99/171 |

OTHER REFERENCES

Modern Packaging, March 1956, p. 174 (99/174)
Modern Packaging, October 1954, p. 40 (99/171)
Food Engineering, May 1957, p. 22 (99/171)
Food Manufacture, December 1959, p. 493 (99/174)

*Primary Examiner*—Frank W. Lutter
*Assistant Examiner*—Steven L. Weinstein
*Attorneys*—Frank E. Robbins, James L. Bailey, Janet E. Price, Robert D. Weist, Martha A. Michaels and Dorothy R. Thumler

ABSTRACT: A "cooking pouch" for foodstuffs such as pasta (e.g. noodles, macaroni, spaghetti), rice, and the like is formed from two separate films, preferably made of heat-sealable plastic, which are sealed together at the edges. One of the films is perforated over a substantial portion of its area, while the other is substantially imperforate, except it may optionally contain a line of weakness such as a perforated line to facilitate opening, and is made of a clear, transparent material.

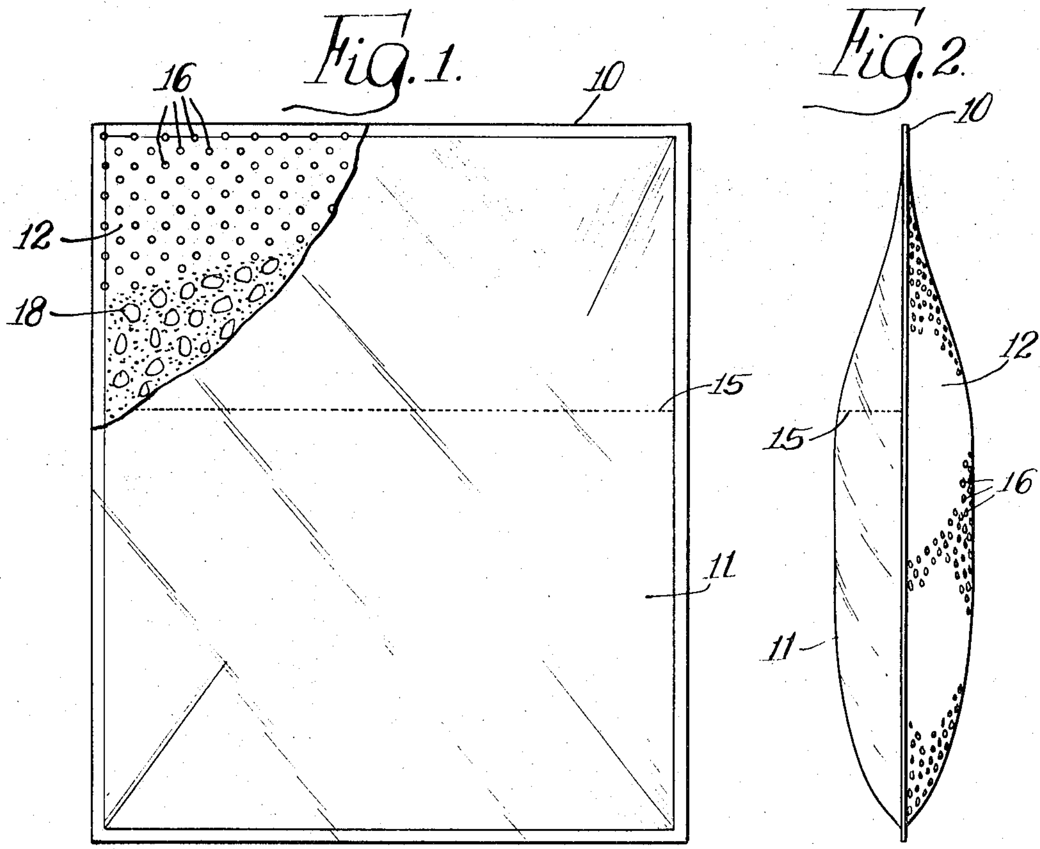
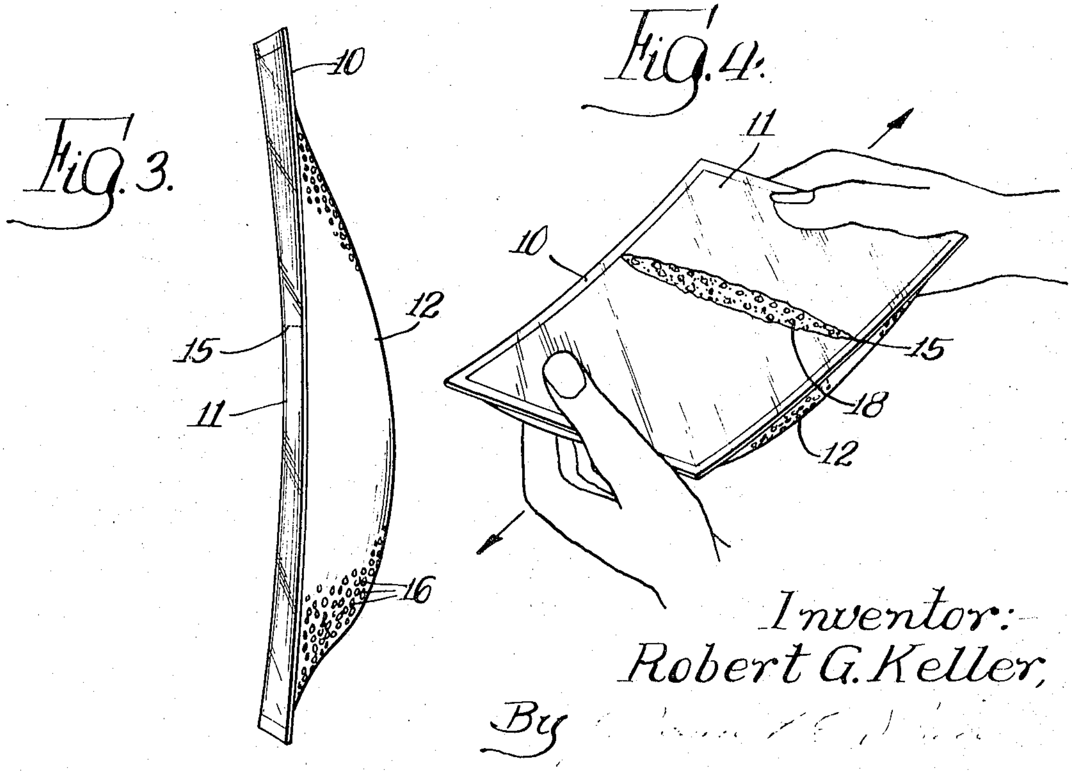
Inventor:
Robert G. Keller,
By

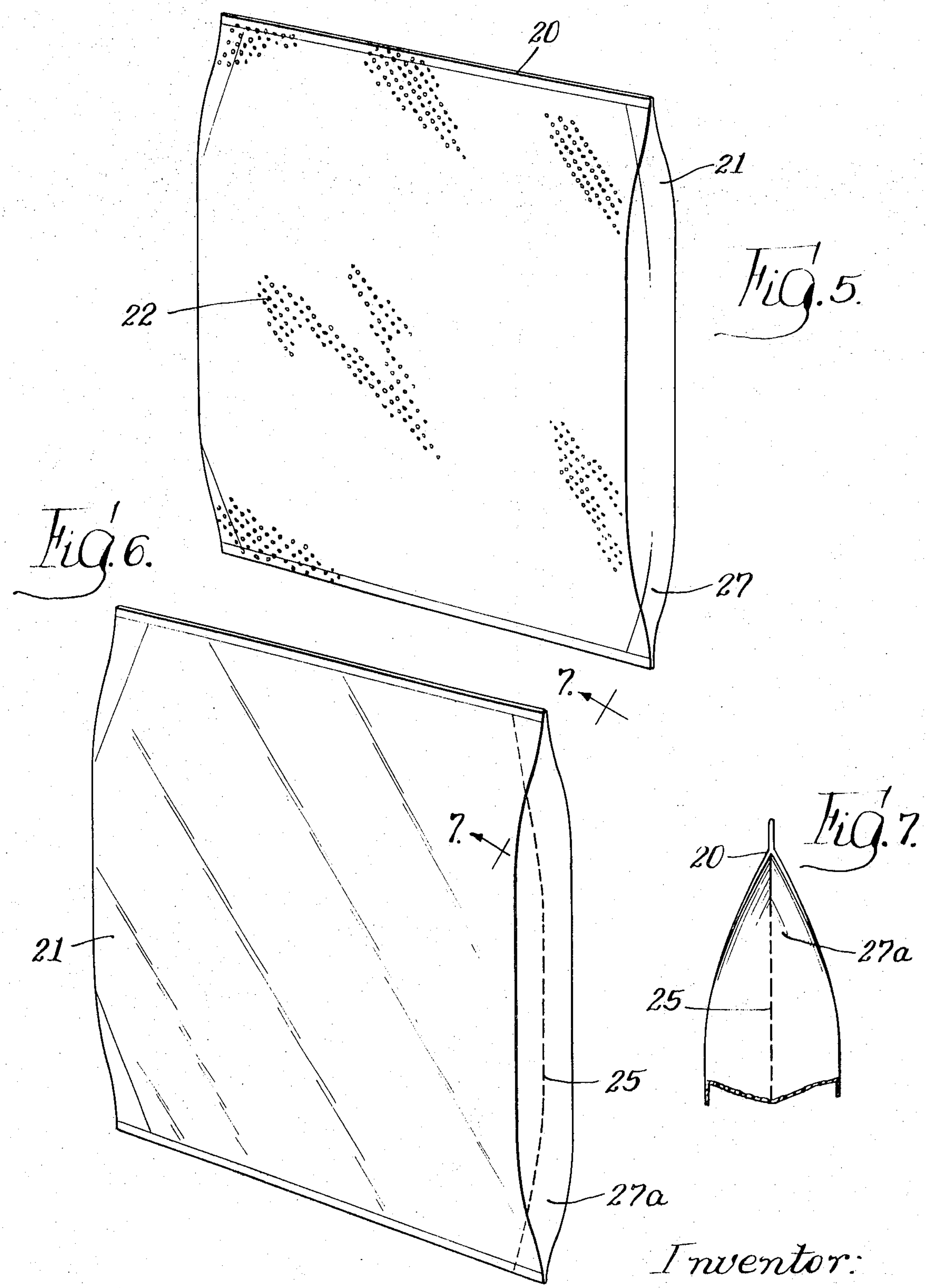
Inventor:
Robert G. Keller
By Janet E. Price

PLASTIC FOOD POUCH FOR COOKING

This invention relates to a container for foodstuffs which are customarily cooked, or heated and hydrated, by immersion in a large quantity of boiling water, after which the excess water is drained from the foodstuffs as in a colander or the like. Examples of such foodstuffs are rice (including partially or completely precooked rice), noodles, macaroni, spaghetti, etc.

The so-called "cooking pouches," or "boil-in-the-bag" pouches, become increasingly popular within recent years. They are used extensively for packaging frozen liquid or liquid-containing foodstuffs, e.g. frozen vegetables plus a butter sauce, hollandaise sauce, or the like. This method of packaging is a great convenience to the consumer; when she wishes to prepare the food for consumption she merely places the pouch into a kettle of boiling water for a time sufficient to cook and/or heat same, then removes the foodstuff from the pouch and serves it.

The cooking pouches are generally made of plastic materials; these materials must, of course, be acceptable as foodstuff packaging, and must also be capable of withstanding immersion in boiling water, as well as the rigors of filling, shipping, and storage, without loss of dimensional stability. Desirably, they are also flexible, heat sealable, as transparent as possible, and as inexpensive as possible. Presently, the most popular material from which the cooking pouches are made is a laminate of a polyester such as Mylar (polyethylene terpthalate) and a polyolefin (e.g. polyethylene). The combination of polyethylene and Mylar is favored for several reasons. It is transparent, the combination may be sealed easily on hot bar type sealers, the Mylar contributes strength and dimensional stability at boiling temperatures, and the structure tears readily from a tear notch.

Recently, a modification of the above described, imperforate, cooking pouch has appeared on the market as a package for rice. This pouch contains a plurality of small holes, or perforations, over its entire area. The consumer places the pouch in a container of boiling water, and after the rice is cooked she removes it and permits the excess water to drain out through the holes. Mylar-polyethylene is not favored for this application for reasons of cost and difficulty in punching. Polyolefins, such as low density polyethylene, lack dimensional stability in boiling water. Medium density polyethylene, having a density in the range of 0.935–0.940 can be punched, but has marginal stability in boiling water. Higher density polyethylene 0.941–0.965 and polypropylene have the desired dimensional stability, but have poor tear properties and tend to split or shatter when punched and are subject to stress cracking in the finished package.

Perforated pouches are generally made of high density polyethylene which is modified by addition of elastomers in order to retain dimensional stability and improve resistance to splitting or tearing. Elastomer-containing high density polyolefin films, while not actually translucent, are nevertheless quite cloudy in appearance, and do not permit the easy viewing of the contents which today's consumer is accustomed to. Furthermore, this material is more expensive than unmodified polyethylene, and the perforating operation adds considerably to the overall cost of the pouch.

It is an object of the present invention to design a container for foodstuffs which are customarily cooked or heated and hydrated in a large quantity of water, after which the excess water is drained therefrom as by use of a colander or like, e.g. rice, pasta, noodles, etc. which permits the foodstuffs to be cooked therein in an extremely simple manner, without the necessity of measuring the foodstuffs prior to cooking, and without the necessity of using a utensil such as a colander or sieve for the draining operation.

Another object of the present invention is to design a pouch within which rice, pasta, or the like can be both packaged and ultimately cooked for consumption, which permits easy viewing of the contents by the consumer.

A further object is to design a pouch within which rice, pasta, or the like can be packaged and cooked, which pouch is considerably less expensive than those of the prior art.

An additional object is to design a pouch for the packaging and ultimate cooking of rice, pasta, and the like which, after completion of the cooking operation and after draining off the excess water from the cooked foodstuffs, can be readily and simply opened by the consumer without the necessity of cutting the pouch with a scissors, knife, or the like.

Additional objects and advantages will appear hereinafter.

In the drawings:

FIG. 1 is a front elevation, partly broken away, of a cooking pouch that is constructed in accordance with one embodiment of the invention, and that is filled with an appropriate foodstuff;

FIG. 2 is a side view thereof;

FIG. 3 is a side view of the pouch, after the cooking operation has been completed, showing the slight shrinkage that has taken place at one side of the pouch, as a result of its contact with boiling water;

FIG. 4 is a perspective view of the pouch shown in FIG. 3, on a reduced scale, illustrating the opening of the pouch by the consumer after the cooking operation;

FIG. 5 is a perspective view of a cooking pouch that is constructed in accordance with a modified embodiment of the invention;

FIG. 6 is a perspective view of the same pouch from the opposite side, and

FIG. 7 is a fragmentary section taken on the line 7—7 of FIG. 6, on an enlarged scale, looking in the direction of the arrows.

The invention will now be described in detail, with reference to the drawings.

As shown in FIGS. 1 and 2, the pouch 10 comprises two separate sheets of synthetic plastic film 11 and 12, which are sealed together at their edges. One of these sheets 11 is made of a very clear, transparent film material, preferably a plastic material such as a medium density polyethylene. This sheet of film is substantially imperforate over its entire area except that it can optionally contain a line of weakness 15 which may be in the form of one or more perforated lines, score lines, or the like.

The second sheet of film 12 is also preferably made of a plastic material, preferably a high density polyethylene which has been modified by the addition of elastomers. This sheet of film is formed with a plurality of small openings or perforations 16 that are arranged in a pattern that extends over its entire surface or at least a major portion thereof.

The pouch is filled with a suitable foodstuff 18 such as, for example, rice or a pasta.

In a preferred embodiment of the invention the imperforate sheet of film 11 containing the line of weakness 15 is made of a material which shrinks slightly upon contact with boiling water, while the perforated sheet 12 is made of a material which does not shrink, or shrinks to a lesser extent than the imperforate film, when immersed in boiling water.

To use a pouch made in accordance with this invention, and filled with rice, the consumer places the filled pouch in water and heats it. The water enters the pouch through the perforations 16 and circulates freely as the heating is continued to cook the rice. When the rice has been cooked, the pouch is removed from the boiling water, and is permitted to drain. Since the exposure to the boiling water causes the sheet of film material 11 to shrink to a greater extent than the perforated sheet 12, the pouch now assumes a bowed-out appearance, as shown in FIG. 3. To dispense the cooked rice from the pouch, the consumer merely grips the opposite ends of the pouch and gives a slight tug, whereupon the pouch readily opens along the line of weakness 15 and the rice 18 can be easily poured out.

FIGS. 5, 6 and 7 illustrate another embodiment of the invention, which is particularly suitable for packaging larger amounts of foodstuffs. The pouch 20 is made of a perforated sheet of film 22 and a transparent imperforate sheet of film 21. The sheet 21 is formed with gusset folds 27 and 27*a* at its opposite sides, respectively, to facilitate expansion. A line of weakness 25 (FIGS. 6 and 7) extends vertically, within the gusset fold 27*a*. FIG. 7 shows the gusseted construction in detail.

Both sheets of film must, of course, be made of materials which are acceptable for use in direct contact with foodstuffs, and both must be capable of withstanding contact with boiling water. They should also both be flexible, and preferably heat sealable, as this is the most practical and economic method of sealing the edges of the film sheets in order to make the pouch. The overall pouch should retain its dimensional stability throughout the operation of filling it with the foodstuff, packaging, transporting and storing the filled container, and ultimately placing same in boiling water. The perforations on the perforated film should, of course, be sufficiently large and sufficiently numerous to permit the water freely to enter and leave the pouch during the cooking and/or heating and hydrating operation, and should be sufficiently small to prevent the foodstuff from passing through the perforations.

For reasons of practicality, economy, and appearance, the perforated film is preferably made of a high density polyethylene which has been modified by the addition of elastomers, and the second film is preferably made of a clear, transparent, unmodified, medium density polyethylene. Surprisingly, although a pouch made solely of unmodified medium density polyethylene will not retain its dimensional stability through such operations as filling with the foodstuff, packaging, shipping, storing, and ultimate immersion in boiling water, the pouch of the invention does retain sufficient dimensional stability throughout all of these operations.

As was mentioned previously, in a greatly preferred embodiment the transparent, imperforate side of the pouch contains a line of weakness, such as one or more narrow perforated lines. This permits the consumer to open the package quickly and simply, without resorting to a scissors, knife, or the like. Furthermore, it is highly desirable for the perforated film, i.e. the one not containing the line of weakness, to be of material which resists shrinkage when in contact with boiling water during the cooking operation and for the second film, which contains the line of weakness, to shrink slightly during immersion in boiling water. As a result, opening the package is extremely simple for the consumer, as, after the excess water has been permitted to drain from the package, she merely grips the opposite ends of the pouch and gives a very slight pull, upon which the pouch readily opens along the line of weakness. The aforementioned preferred materials, i.e. the elastomer-containing high density polyethylene film (which is resistant to shrinkage at boiling water temperatures) and the unmodified medium density polyethylene (which will shrink slightly during contact with boiling water) confer this desirable feature upon the overall pouch.

The pouches can be made in any size, and can contain any amount of foodstuffs, although from a marketing standpoint it is desirable to package unit portions of from 1 to about 4 servings in any one particular pouch.

The pouch is exceptionally suitable for packaging rice, either uncooked, partially cooked, or completely precooked. It is also suitable for packaging pasta, e.g. spaghetti, macaroni, noodles, etc.

The following examples will illustrate the practice of the invention. They are presented for illustrative purposes only and should not be considered as limiting the invention in any way.

EXAMPLE I

A pouch was made by heat sealing together three sides of two 5 inch by 6 inch rectangular films, one film being a 2 mil medium density polyethylene and the second film being a 2 mil high density polyethylene modified by the addition of elastomers. The high density polyethylene film was perforated over its entire surface with 0.045 inch diameter holes, 114 per square inch. Sixty grams of precooked, dry long grain rice was placed in the pouch and the fourth edge was heat sealed.

Two quarts of salted water was brought to a boil and the pouch was immersed in the boiling water for 10 minutes. At the end of the cooking time the pouch was removed and the water was permitted to drain from the rice for about 20 seconds. The pouch was then opened with a scissors, and the rice poured onto a serving plate. The rice was fully and uniformly cooked and had an excellent fluffy texture.

The example was then repeated except prior to forming the pouch a narrow perforated line was cut near one end of the medium density polyethylene film. After the cooking and draining operations the pouch was gripped at opposite ends and held, medium density polyethylene side down, over a plate. The pouch was given a slight pull, upon which, because the medium density polyethylene film had shrunk slightly, the pouch readily opened along the perforated line and the rice could easily be poured onto the plate.

EXAMPLE II

A gusseted pouch was made by heat sealing together three sides of two rectangular pieces of film. In this instance the medium density polyethylene measured 8 inches square and the perforated film 6 by 8 inches. The medium density side was formed with ½ inch deep gusset along two sides. A line of perforations were made in the "V" of one gusset. Both films were similar to those used in example I. Sixty grams of Fusilli (a helix form of spaghetti) were packed into the pouch parallel to the 6 inch dimension and the pouch was sealed.

The package was immersed in salted boiling water for 11 minutes and removed and drained for 10 seconds. At this time the opposing sides of the gusset containing the line of perforation were given a slight pull upon which the medium density polyethylene opened and the cooked Fusilli poured into a dish. In this example where the volume of the dry product warrants the use of a gusseted pouch, it may be seen that more than half of the perforated modified high density polyethylene has been replaced by less expensive medium density nonperforated film which also allows complete visibility of the product when the perforated side is down.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A food pouch comprising two separate films sealed together at their edges and containing a foodstuff therein, synthetic plastic both of said films being flexible and capable of withstanding contact with boiling water, the first of said films having the following properties:

it contains a plurality of perforations disposed over a substantial portion of its area, said perforations being sufficiently large and sufficiently numerous to permit water freely to enter and leave the pouch when said pouch, with the foodstuff contained therein, is immersed in water, the perforations furthermore being sufficiently small to prevent egress from said pouch of the foodstuff contained therein;

it is made of a material which has sufficient strength so that the perforated first film maintains its dimensional stability throughout the operations of filling the pouch with a foodstuff, packaging, transporting and storing the filled pouch, and ultimately placing the filled pouch in boiling water;

it is made of a material which resists shrinkage when placed in contact with boiling water;

the second of said films having the following properties:

it is made of an imperforate, clear, transparent material, which material has the property of shrinking slightly when placed in contact with boiling water;

it contains a line of weakness.

2. The pouch of claim 1 wherein the first film, which is perforated and which is resistant to shrinkage when placed in contact with boiling water, is made of a high density polyolefin, modified by the addition of elastomers; and wherein the second film, which is imperforate and which has the property of shrinking slightly when placed in contact with boiling water, is made of a clear, transparent, medium density polyethylene.

3. A flexible pouch containing a foodstuff therein, which pouch is capable of withstanding contact with boiling water, said pouch being formed of two generally rectangular sheets of synthetic plastic film that are sealed together along their peripheral edges, the first of said sheets having the following properties:

it contains a plurality of perforations that are disposed in spaced relation to each other in a pattern that extends over a substantial portion of the surface area of the sheet, the perforations being sufficiently large and sufficiently numerous to permit water freely to enter and leave the pouch when said pouch, with the foodstuff contained therein, is immersed in water, the perforations furthermore being sufficiently small to prevent egress from the pouch of the foodstuff contained therein;

it is made of a high density polyolefin modified by the addition of elastomers, the high density, modified, polyolefin film having sufficient strength so that the perforated first sheet maintains its dimensional stability throughout the operations of filling the pouch with the foodstuff, sealing the pouch, subsequent handling, and ultimately cooking the foodstuff by immersing the filled pouch in boiling water;

said second sheet having the following properties;

it is made of an imperforate, clear, transparent film of medium density polyethylene;

it contains a line of weakness.

4. The pouch of claim 3 wherein said high density polyolefin comprises polyethylene.

* * * * *

PO-1050
(5/69)

UNITED STATES PATENT OFFICE
CERTIFICATE OF CORRECTION

Patent No. 3,615,712 Dated October 26, 1971

Inventor(s) Robert G. Keller

It is certified that error appears in the above-identified patent and that said Letters Patent are hereby corrected as shown below:

Column 1, line 10, "become" should read --have become--;

Column 4, line 49, in Claim 1, after the word"separate" add --synthetic plastic--; line 51, remove "synthetic plastic"

Signed and sealed this 28th day of March 1972.

(SEAL)
Attest:

EDWARD M.FLETCHER,JR.
Attesting Officer

ROBERT GOTTSCHALK
Commissioner of Patents